(12) United States Patent
Liu (10) Patent No.: US 10,361,791 B2
(45) Date of Patent: Jul. 23, 2019

(54) INFORMATION INTERACTION METHODS AND USER EQUIPMENT

(71) Applicant: BEIJING ZHIGU RUI TUO TECH CO., LTD., Beijing (CN)

(72) Inventor: Jia Liu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/539,757

(22) PCT Filed: Nov. 20, 2015

(86) PCT No.: PCT/CN2015/095111
§ 371 (c)(1),
(2) Date: Jun. 26, 2017

(87) PCT Pub. No.: WO2016/101741
PCT Pub. Date: Jun. 30, 2016

(65) Prior Publication Data
US 2017/0373763 A1    Dec. 28, 2017

(30) Foreign Application Priority Data

Dec. 27, 2014    (CN) .......................... 2014 1 0829714

(51) Int. Cl.
*H04B 7/00*    (2006.01)
*H04B 13/00*    (2006.01)
*G06F 1/16*    (2006.01)

(52) U.S. Cl.
CPC ........... *H04B 13/005* (2013.01); *G06F 1/163* (2013.01)

(58) Field of Classification Search
CPC ................. H04B 13/005; G06F 1/63
USPC ....... 455/67.14, 67.11, 100, 344, 41.1, 41.2; 341/33
See application file for complete search history.

(56) References Cited

U.S. PATENT DOCUMENTS

| | | | |
|---|---|---|---|
| 5,404,587 A * | 4/1995 | Okanobu | H03D 3/004 455/182.2 |
| 6,211,799 B1 * | 4/2001 | Post | A61B 5/0028 341/33 |
| 6,754,472 B1 * | 6/2004 | Williams | H04Q 9/04 455/100 |
| 8,668,145 B2 * | 3/2014 | Tessier | G06K 7/08 235/380 |

(Continued)

OTHER PUBLICATIONS

English translation of Chinese Patent Publication No. CN102478959 published May 30, 2012.

(Continued)

*Primary Examiner* — Edward F Urban
*Assistant Examiner* — Max Mathew
(74) *Attorney, Agent, or Firm* — Sheppard Mullin Richter & Hampton LLP (57) ABSTRACT

Embodiments of the present application provide interaction methods and user equipment. An interaction method disclosed here in comprises: determining, by a user equipment, information that needs to be sent to at least one other user equipment, wherein the at least one other user equipment and the user equipment are in contact with a same human body; determining at least one frequency corresponding to the information at least according to the information and a preset information rule; and controlling a capacitance value of the user equipment to change at the at least one frequency.

24 Claims, 4 Drawing Sheets

(56) References Cited

U.S. PATENT DOCUMENTS

| | | | |
|---|---|---|---|
| 9,764,083 B1* | 9/2017 | Savoie | A61M 5/14248 |
| 9,851,849 B2* | 12/2017 | Krah | G06F 3/044 |
| 2009/0124282 A1* | 5/2009 | Kim | H04B 13/005 |
| | | | 455/550.1 |
| 2009/0204170 A1* | 8/2009 | Hastings | A61N 1/0565 |
| | | | 607/33 |
| 2009/0233558 A1* | 9/2009 | Hwang | A61B 5/0002 |
| | | | 455/67.14 |
| 2010/0202354 A1* | 8/2010 | Ho | G06Q 10/06 |
| | | | 370/328 |
| 2010/0202494 A1* | 8/2010 | Roh | H04B 1/7176 |
| | | | 375/132 |
| 2011/0213205 A1* | 9/2011 | Uchiyama | A61B 1/00009 |
| | | | 600/118 |
| 2014/0171053 A1 | 6/2014 | Stephens | |
| 2014/0184555 A1 | 7/2014 | Pi et al. | |
| 2015/0092962 A1* | 4/2015 | Amento | H04K 1/00 |
| | | | 381/151 |
| 2015/0318932 A1* | 11/2015 | Kerselaers | H04R 25/55 |
| | | | 381/315 |
| 2015/0365825 A1* | 12/2015 | De Leon | H04L 63/08 |
| | | | 726/19 |
| 2016/0062519 A1* | 3/2016 | Park | G06F 3/047 |
| | | | 345/173 |
| 2016/0089075 A1* | 3/2016 | Cowley | H04W 4/80 |
| | | | 600/547 |
| 2016/0344767 A1* | 11/2016 | Baldwin | G06F 21/32 |
| 2017/0111124 A1* | 4/2017 | Ohishi | H04B 13/00 |
| 2017/0244495 A1* | 8/2017 | Ouzounov | G06F 13/4072 |
| 2018/0008770 A1* | 1/2018 | Savoie | A61M 5/14248 |

OTHER PUBLICATIONS

English translation of Chinese Patent Publication No. CN103605423 published Feb. 26, 2014.
English translation of Chinese Patent Publication No. CN104507039 published Apr. 8, 2015.
English translation of Chinese Patent Publication No. CN104571507 published Apr. 29, 2015.
English translation of Chinese Patent Publication No. CN203882299 published Oct. 15, 2014.

* cited by examiner

FIG. 7

INFORMATION INTERACTION METHODS AND USER EQUIPMENT

CROSS-REFERENCE TO RELATED APPLICATIONS

This application is a National Phase Application of International Application No. PCT/CN2015/095111, filed on Nov. 20, 2015, which claims priority to and benefit of Chinese Patent Application No. 201410829714.3, filed on Dec. 27, 2014, and entitled "Interaction Methods and Apparatus", each of which is herein incorporated by reference in its entirety.

TECHNICAL FIELD

Embodiments of the present application generally relate to the field of communication technologies, and in particular, to interaction methods and user equipment.

BACKGROUND

Owing to limited power, a large number of sensor devices and wearable devices tend to use a low-power consumption network technology such as Zigbee and Bluetooth low power (BLE for short) when making a wireless connection. This kind of networks generally support variable connection intervals, so as to match the most appropriate transmission frequency for particular transmission needs of different data, thereby reducing power consumption.

By using the BLE as an example, a device can set or modify at least one connection parameter after a data connection is established. Specifically, the BLE sets out two connection parameters. One is a connection interval, that is, a data sending interval between a master device and a slave device, and a value range thereof is from 7.5 ms to 4.0 s. The other is a slave device delay, that is, the number of connection intervals by which the slave device is allowed to delay monitoring. In this way, the slave device can perform monitoring once after skipping several connection intervals, which further reduces its power consumption.

In some application scenarios, a user needs to rapidly acquire and view data. For example, a user wearing a smart wristband hopes to view physical feather data on a mobile phone connected to the smart wristband, in such cases, the at least one connection parameter needs to be adjusted to enable a higher data acquisition speed. However, because data transmission interval between devices is generally big, although a user can set a smaller connection interval, the set command cannot be sent to a peer device until the next transmission opportunity. In other words, interaction can only be made with the peer device after a relatively long waiting time.

SUMMARY

In view of this, one objective of embodiments of the present application lies in providing an information interaction solution between devices.

In order to achieve the above objective, according to a first aspect of the embodiments of the present application, an interaction method is provided, comprising:

determining, by a user equipment, information that needs to be sent to at least one other user equipment, wherein the at least one other user equipment and the user equipment are in contact with a same human body;

determining at least one frequency corresponding to the information at least according to the information and a preset information rule; and controlling a capacitance value of the user equipment to change at the at least one frequency.

In order to achieve the above objective, according to a second aspect of the embodiments of the present application, an interaction method is provided, comprising:

determining, by a user equipment, at least one frequency at which an equivalent capacitance of a user equipment side changes, wherein the equivalent capacitance of the user equipment side is generated based on that the user equipment and at least one other user equipment are in contact with a same human body; and determining information corresponding to the at least one frequency at least according to the at least one frequency and a preset information rule.

In order to achieve the above objective, according to a third aspect of the embodiments of the present application, a user equipment is provided, comprising:

a first determination module, configured to determine information that needs to be sent to at least one other user equipment, wherein the at least one other user equipment and the user equipment are in contact with a same human body;

a second determination module, configured to determine at least one frequency corresponding to the information at least according to the information and a preset information rule; and a controlling module, configured to control a capacitance value of the user equipment to change at the at least one frequency.

In order to achieve the above objective, according to a fourth aspect of the embodiments of the present application, a user equipment is provided, comprising:

a first determination module, configured to determine at least one frequency at which an equivalent capacitance of a user equipment side changes, wherein the equivalent capacitance of the user equipment side is generated based on that the user equipment and at least one other user equipment are in contact with a same human body; and a second determination module, configured to determine information corresponding to the at least one frequency at least according to the at least one frequency and a preset information rule.

At least one technical solution in the multiple technical solutions has the following beneficial effects:

In the embodiments of the present application, an information interaction solution between devices is provided by determining, by a user equipment, information that needs to be sent to at least one other user equipment, wherein the at least one other user equipment and the user equipment are in contact with a same human body; determining at least one frequency corresponding to the information at least according to the information and a preset information rule; and controlling a capacitance value of the user equipment to change at the at least one frequency. Moreover, information is interacted in an out-of-band manner, which is more convenient.

DETAILED DESCRIPTION

Specific implementations of the present application are described in further detail below with reference to the accompanying drawings and embodiments. The following embodiments are intended to describe the present application, but not to limit the scope of the present application.

Figure 1:
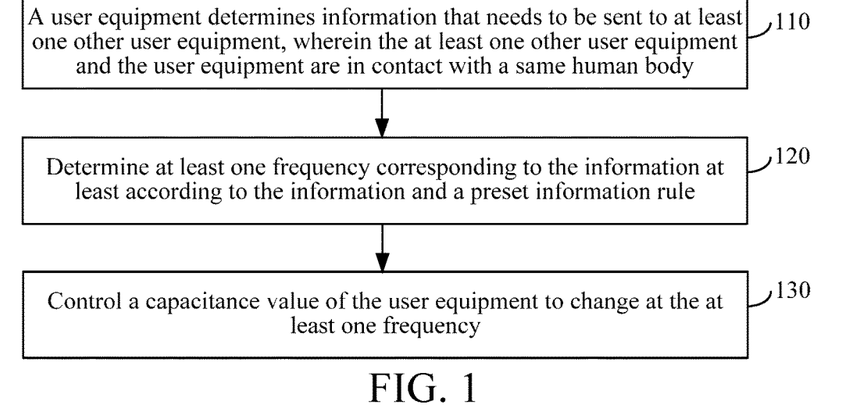
FIG. 1 is a schematic flowchart of an interaction method Embodiment 1 according to the present application.

FIG. 1 is a schematic flowchart of an interaction method Embodiment 1 according to the present application. As shown in FIG. 1, this embodiment comprises:

110. A user equipment determines information that needs to be sent to at least one other user equipment, wherein the at least one other user equipment and the user equipment are in contact with a same human body.

In this embodiment, each of the user equipment and the at least one other user equipment may be any device that can interact with a user, which comprises, but is not limited to: a hand-held device, a wearable device, and the like. The hand-held device comprises, but is not limited to: a mobile phone, a tablet computer (PAD), and the like; and the wearable device may be, but is not limited to: a smart wristband, a smart ring, and the like. In this embodiment, equipment types of the at least one other user equipment and the user equipment may be the same or different. For example, the user equipment is a mobile phone, one other user equipment is another mobile phone or a PAD; and the user equipment is a mobile phone, one other user equipment is a smart wristband.

In this embodiment, the user equipment may be in contact with any part of the human body. For example, when the user equipment is a mobile phone, the user equipment is optionally in contact with a part of the human body such as a finger or a palm; and when the user equipment is a smart band, the user equipment is optionally in contact with a part of the human body such as a finger, a palm, or a wrist. Other user equipment may contact with the human body in similar manners.

120. Determine at least one frequency corresponding to the information at least according to the information and a preset information rule.

In this embodiment, the at least one frequency may be one frequency or multiple frequencies.

In this embodiment, the information rule comprises: a corresponding relationship between information and at least one frequency.

For example, in the information rule, first information is corresponding to 50 Hz, second information is corresponding to 80 Hz, and third information is corresponding to 90 Hz and 100 Hz.

130. Control a capacitance value of the user equipment to change at the at least one frequency.

In this embodiment, the capacitance value of the user equipment is a capacitance value of a grounding capacitance of the user equipment.

In this embodiment, there may be multiple manners of controlling the capacitance value of the user equipment to change. For example, a capacitance value of a variable capacitor of the user equipment is controlled to change, so that the capacitance value of the grounding capacitance of the user equipment changes, wherein the variable capacitor may be set on a circuit board of the user equipment.

In this embodiment, because the user equipment and the at least one other user equipment are both in contact with the human body, when the user equipment performs 130, the at least one other user equipment can acquire the at least one frequency and determine the information that the user equipment needs to send based on the same information rule.

Figure 2A:
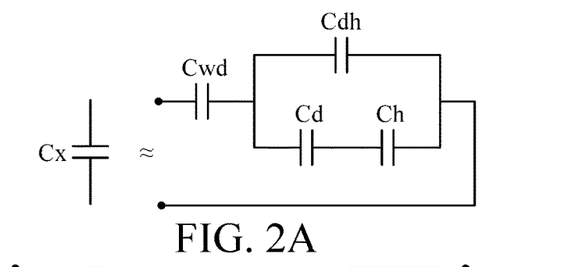
FIG. 2A is a schematic circuit diagram of an equivalent capacitance when the user equipment is in contact with the human body.

For example, the user equipment is a smart wristband. When the smart wristband is worn on a wrist of the human body, FIG. 2A is a schematic circuit diagram of an equivalent capacitance when the user equipment is in contact with the human body. As shown in FIG. 2A, Cwd is a capacitance between the wrist and the smart wristband; Cdh is a capacitance between the smart wristband and the human body; Cd is a capacitance of the smart wristband; Ch is a capacitance of the human body; and Cx is an equivalent capacitance on the user equipment side.

Figure 2B:
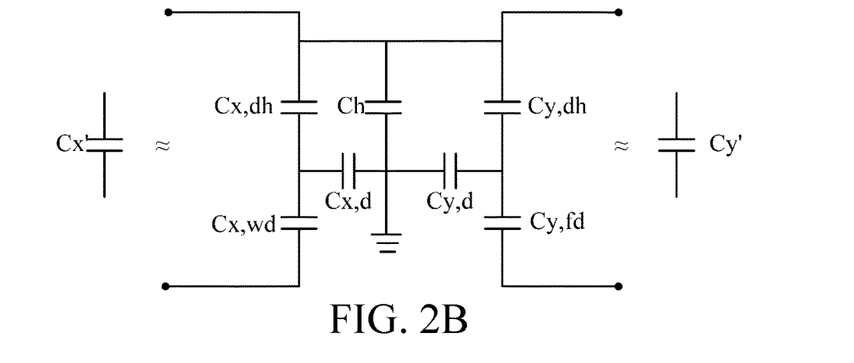
FIG. 2B is a schematic circuit diagram of equivalent capacitances when the user equipment and the other user equipment are both in contract with the human body.

By using that one other user equipment is a mobile phone as an example, when the human body uses a finger of a hand wearing the smart wristband to touch the mobile phone, FIG. 2B is a schematic circuit diagram of equivalent capacitances when the user equipment and the other user equipment are both in contact with the human body. As shown in FIG. 2B, Cx,wd is a capacitance between the wrist and the smart wristband; Cx,dh is a capacitance between the smart wristband and the human body; Cx,d is a capacitance of the smart wristband; Ch is a capacitance of the human body; Cy,fd is a capacitance between the finger and the mobile phone; Cy,dh is a capacitance between the mobile phone and the human body; Cy,d is a capacitance of the mobile phone; Cx' is an equivalent capacitance on the user equipment side; and Cy' is an equivalent capacitance on the other user equipment side. It can be seen from FIG. 2B that when Cx,d changes at at least one frequency, Cy' may also change at the at least one frequency correspondingly. Therefore, the at least one frequency may be detected on the other user equipment side.

In this embodiment, an information interaction solution between devices is provided by determining, by a user equipment, information that needs to be sent to at least one other user equipment, wherein the at least one other user equipment and the user equipment are in contact with a same human body; determining at least one frequency corresponding to the information at least according to the information and a preset information rule; and controlling a capacitance value of the user equipment to change at the at least one frequency. Moreover, information is interacted in an out-of-band manner, which is more convenient.

The following further describes the method in this embodiment by using some optional implementation manners.

In this embodiment, the controlling a capacitance value of the user equipment to change at the at least one frequency may be controlling the capacitance value of the user equipment to continuously or discretely change at the at least one frequency.

For example, the at least one frequency is a frequency f1, a capacitance value of the user equipment is C1 when t=0. Correspondingly, in 130, the capacitance value of the user equipment may be controlled to change to C2 when t=1/f1, and the capacitance value of the user equipment may be controlled to change to C1 when t=2/f1; or in 130, the capacitance value of the user equipment may be controlled to gradually change from C1 to C2 during t=0~1/f1, and the capacitance value of the user equipment may be controlled to gradually change from C2 to C1 during t=1/f1~2/f1.

In this embodiment, optionally, the at least one frequency may be multiple frequencies.

Further, optionally, the controlling a capacitance value of the user equipment to change at the at least one frequency comprises: controlling the capacitance value of the user equipment to change at the multiple frequencies sequentially.

Optionally, the capacitance value of the user equipment is controlled to cyclically change at the multiple frequencies sequentially.

Optionally, in the information rule, different information is corresponding to the same multiple frequencies, but orders among the multiple frequencies are different.

For example, under the information rule, first information is corresponding to frequencies f1, f2, and f3, and correspondingly, if the information determined in 110 is the first information, in 130, the capacitance value of the user equipment is controlled to change at f1, f2, and f3 sequentially; under the information rule, second information is corresponding to frequencies f1, f3, and f2, and correspondingly, if the information determined in 110 is the second information, in 130, the capacitance value of the user equipment is controlled to change at f1, f3, and f2 sequentially.

In this embodiment, content of the information may be of multiple types. Optionally, the information comprises, but is not limited to, at least one of the following: at least one instruction, sensor data, and at least one transmission parameter.

Optionally, the at least one instruction comprises, but is not limited to, at least one of the following: a screen unlocking instruction, a notice display instruction, a data display instruction, and the like.

Optionally, the sensor data may comprise data of any type, such as temperature data and human body physical feature data.

For example, if the user equipment wants the at least one other user equipment to unlock its(their) screen(s), the information determined in 110 comprises a screen unlocking instruction; if the user equipment wants the at least one other user equipment to display a notice received before, for example, a short message, the information determined in 110 comprises a notice display instruction; if the user equipment wants the at least one other user equipment to unlock its(their) screen(s) and display a notice received before, the information determined in 110 comprises a screen unlocking instruction and a notice display instruction; and if the user equipment wants the at least one other user equipment to display sensor data sensed by the user equipment, the information determined in 110 comprises a data display instruction and the sensor data.

Optionally, the at least one transmission parameter comprises, but is not limited to, at least one of the following: a transmission channel, a transmission delay, and a code word.

The transmission channel refers to a data signal transfer channel in which wireless signals act as transmission medium. For example, for frequency hopping communication, a transmission channel may be identified by a hopping sequence number (HSN for short).

For an information sender, the transmission delay is used for determining a starting time of sending the information; and for an information recipient, the transmission delay is used for determining a starting time of receiving the information.

The code word is also called a code pattern. For the information sender, the code word may be used for encoding the information to be sent; and for the information recipient, the code word may be used for decoding the information received.

In an optional implementation manner, the information comprises: the at least one transmission parameter.

Correspondingly, this embodiment further comprises: communicating with the at least one other user equipment at least according to the at least one transmission parameter.

Specifically, content that the user equipment communicates with the at least one other user equipment may be of different kinds, for example, an instruction, sensor data, and a connection parameter that needs to be set.

Figure 3:
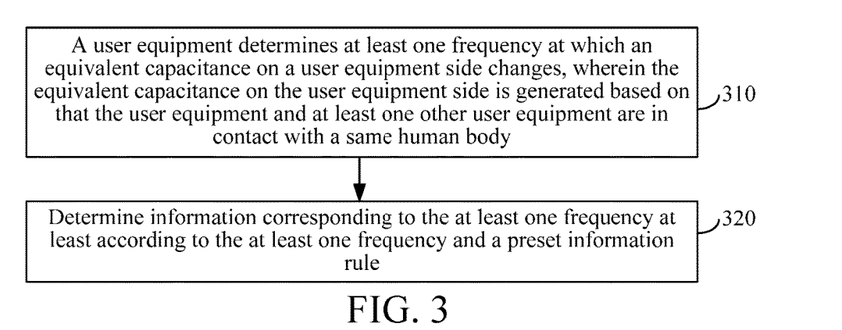
FIG. 3 is a schematic flowchart of an interaction method Embodiment 2 according to the present application.

FIG. 3 is a schematic flowchart of an interaction method Embodiment 2 according to the present application. As shown in FIG. 3, this embodiment comprises:

310. A user equipment determines at least one frequency at which an equivalent capacitance on the user equipment side changes, wherein the equivalent capacitance on the user equipment side is generated based on that the user equipment and at least one other user equipment are in contact with a same human body.

In this embodiment, each of the user equipment and the at least one other user equipment may be any device that can interact with a user, which may be, but is not limited to: a hand-held device, a wearable device, and the like. The hand-held device may be, but is not limited to: a mobile phone, a tablet computer (PAD), and the like; and the wearable device may be, but is not limited to: a smart wristband, a smart ring, and the like.

In this embodiment, equipment types of the at least one other user equipment and the user equipment may be the same or different. For example, the user equipment is a mobile phone, one other user equipment is another mobile phone or a PAD; and the user equipment is a mobile phone, one other user equipment is a smart wristband.

In this embodiment, the user equipment may be in contact with any part of the human body. For example, when the user equipment is a mobile phone, the user equipment is optionally in contact with a part of the human body such as a finger or a palm; and when the user equipment is a smart band, the user equipment is optionally in contact with a part of the human body such as a finger, a palm, or a wrist. Any other user equipment may contact with the body in similar manners.

In this embodiment, the equivalent capacitance on the user equipment side is an equivalent capacitance detected on the user equipment side. Specifically, because the user equipment and the at least one other user equipment are both in contact with the human body, and equivalent capacitances in this scenario are shown as FIG. 2B, it can be seen that the equivalent capacitance on the user equipment side is at least affected by respective capacitance value of the human body and the at least one other user equipment.

In this embodiment, the at least one frequency may be one frequency or multiple frequencies.

320. Determine information corresponding to the at least one frequency at least according to the at least one frequency and a preset information rule.

In this embodiment, the information rule comprises: a corresponding relationship between at least one frequency and information and/or a corresponding relationship between at least one frequency range and information.

For example, in the information rule, 50 Hz is corresponding to first information, 80 Hz is corresponding to second information, and 90 Hz and 100 Hz are corresponding to third information. For another example, in the information rule, [50 Hz, 60 Hz) is corresponding to first information, and [80 Hz, 90 Hz) is corresponding to second information.

It should be noted that in a scenario in which the information rule comprises the corresponding relationship between at least one frequency range and information, information error caused by measurement error of the at least one frequency may be reduced to a certain extent.

In this embodiment, an information interaction solution between devices is provided by determining, by a user equipment, at least one frequency at which an equivalent capacitance of a user equipment side changes, wherein the equivalent capacitance of the user equipment side is generated based on that the user equipment and at least one other user equipment are in contact with a same human body; and determining information corresponding to the at least one frequency at least according to the at least one frequency and a preset information rule. Moreover, information is interacted in an out-of-band manner, which is more convenient.

The following further describes the method in this embodiment by using some optional implementation manners.

In this embodiment, there are multiple reasons for which the equivalent capacitance on the user equipment side changes.

In an optional implementation manner, a capacitance value of one other user equipment of the at least one other user equipment changes at the at least one frequency.

Specifically, the capacitance value of the other user equipment is a capacitance value of a grounding capacitance of the other user equipment.

In a possible scenario, the user equipment is a smart wristband. When the smart wristband is worn on a wrist of the human body, as shown in FIG. 2A, Cwd is a capacitance between the wrist and the smart wristband; Cdh is a capacitance between the smart wristband and the human body; Cd is a capacitance of the smart wristband; Ch is a capacitance of the human body; and Cx is an equivalent capacitance on the user equipment side.

Further, one other user equipment may be a mobile phone. When the human body uses a finger of a hand wearing the smart wristband to touch the mobile phone, as shown in FIG. 2B, Cx,wd is a capacitance between the wrist and the smart wristband; Cx,dh is a capacitance between the smart wristband and the human body; Cx,d is a capacitance of the smart wristband; Ch is a capacitance of the human body; Cy,fd is a capacitance between the finger and the mobile phone; Cy,dh is a capacitance between the mobile phone and the human body; Cy,d is a capacitance of the mobile phone; Cx' is an equivalent capacitance on the user equipment side; and Cy' is an equivalent capacitance on the other user equipment side. It can be seen from FIG. 2B that when Cy,d changes at at least one frequency, Cx' may also change at the at least one frequency correspondingly. Therefore, the at least one frequency may be detected on the user equipment side.

In a possible scenario of this implementation manner, the at least one frequency may be multiple frequencies. Correspondingly, the capacitance value of the other user equipment changes at the multiple frequencies sequentially.

In this scenario, optionally, the capacitance value of the other user equipment cyclically changes at the multiple frequencies sequentially.

In this scenario, optionally, in the information rule, orders among multiple frequencies are different, and corresponding information may be the same or different.

For example, the multiple frequencies comprise: f1, f2, and f3, which means that the capacitance value of the other user equipment changes at the frequencies f1, f2, and f3 sequentially, and the multiple frequencies comprise: f1, f3, and f2, which means that the capacitance value of the other user equipment changes at the frequencies f1, f3, and f2 sequentially; and further, information corresponding to f1, f2, and f3 may be the same as, or different from, information corresponding to f1, f3, and f2.

For another example, the multiple frequencies comprise: f1, f2, and f3. In the information rule, f1 is corresponding to first information, f2 is corresponding to second information, and f3 is corresponding to third information; or f1, f2, and f3 are corresponding to fourth information; or f1 and f2 are corresponding to fifth information, and f3 is corresponding to sixth information; or the like.

In another optional implementation manner, the at least one frequency is multiple frequencies, and capacitance values of other user equipment of the at least one other user equipment change at the multiple frequencies.

For example, the multiple frequencies comprise: f1, f2, f3, and f4, and the other user equipment comprise: another user equipment A, another user equipment B, and another user equipment C, wherein a capacitance value of user equipment A changes at the frequency f1, a capacitance value of user equipment B changes at the frequency f2, and a capacitance value of user equipment C changes at frequencies f3 and f4; and further, in the information rule, f1 is corresponding to first information, f2 is corresponding to second information, and, f3 and f4 are corresponding to third information, or f3 is corresponding to fourth information and f4 is corresponding to fifth information.

In this implementation manner, optionally, the user equipment determines the multiple frequencies in a manner of filtering.

In this embodiment, content of the information may be of different kinds. Optionally, the information comprises, but is not limited to, at least one of the following: at least one instruction, sensor data, and at least one transmission parameter.

In an optional implementation manner, the information comprises: the at least one instruction. Correspondingly, this embodiment further comprises: executing the at least one instruction.

The at least one instruction comprises, but is not limited to, at least one of the following: a screen unlocking instruction, a notice display instruction, a data display instruction, and the like.

In this implementation manner, optionally, the information further comprises: the sensor data.

The sensor data may comprise data of any type, such as temperature data and human body physical feature data.

For example, if the information determined in 320 comprises a screen unlocking instruction, the user equipment unlocks its screen; if the information determined in 320 comprises a notice display instruction, the user equipment displays a notice received before, for example, a short message; if the information determined in 320 comprises a screen unlocking instruction and a notice display instruction, the user equipment unlocks its screen and displays a notice received before; and if the information determined in 320 comprises a data display instruction and sensor data, the user equipment displays the determined sensor data.

In another optional implementation manner, the information comprises: the sensor data.

The sensor data may comprise data of any type(s), such as temperature data and human body physical feature data.

For example, a temperature sensor in one other user equipment senses temperature data, determines at least one frequency corresponding to the temperature data according to the information rule, and controls a capacitance value thereof to change at the at least one frequency. Correspondingly, because the other user equipment and the user equipment are both in contact with the human body, the user equipment may determine the at least one frequency and determine the temperature data corresponding to the at least one frequency according to the information rule.

In another optional implementation manner, the information comprises: the at least one transmission parameter. Correspondingly, the method further comprises: communicating with the at least one other user equipment at least according to the at least one transmission parameter.

Specifically, the at least one transmission parameter may be, but is not limited to, at least one of the following: a transmission channel, a transmission delay, and a code word.

The transmission channel refers to a data signal transfer channel in which wireless signals act as transmission medium. For example, for frequency hopping communication, a transmission channel may be identified by a HSN.

For an information sender, the transmission delay may be used for determining a starting time of sending the information; and for an information recipient, the transmission delay may be used for determining a starting time of receiving the information.

The code word is also called a code pattern. For the information sender, the code word is used for encoding the information to be sent; and for the information recipient, the code word is used for decoding the information received.

Specifically, content that the user equipment communicates with the one other user equipment may be of different kinds, for example, instruction, sensor data, and connection parameter that needs to be set.

Figure 4A:
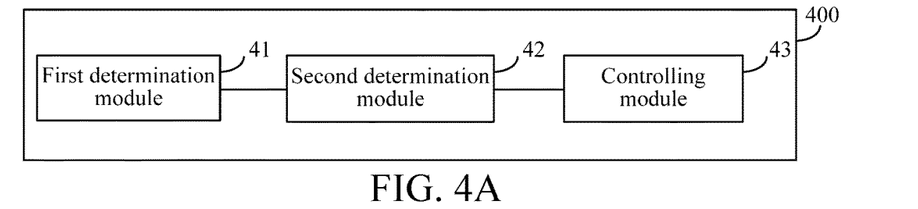
FIG. 4A is a schematic structural diagram of a user equipment Embodiment 1 according to the present application.

FIG. 4A is a schematic structural diagram of a user equipment Embodiment 1 according to the present application. As shown in FIG. 4A, a user equipment 400 comprises:

a first determination module 41, configured to determine information that needs to be sent to at least one other user equipment, wherein the at least one other user equipment and the user equipment 400 are in contact with a same human body;

a second determination module 42, configured to determine at least one frequency corresponding to the information at least according to the information and a preset information rule; and a controlling module 43, configured to control a capacitance value of the user equipment 400 to change at the at least one frequency.

In this embodiment, each of the user equipment 400 and the at least one other user equipment may be any device that can interact with a user, which may be, but is not limited to: a hand-held device, a wearable device, and the like. The hand-held device may be, but is not limited to: a mobile phone, a tablet computer (PAD), and the like; and the wearable device may be, but is not limited to: a smart wristband, a smart ring, and the like.

In this embodiment, equipment types of the at least one other user equipment and the user equipment 400 may be the same or different. For example, the user equipment 400 is a mobile phone, one other user equipment is another mobile phone or a PAD; and the user equipment 400 is a mobile phone, one other user equipment is a smart wristband.

In this embodiment, the user equipment 400 may be in contact with any part of the human body. For example, when the user equipment 400 is a mobile phone, the user equipment 400 is optionally in contact with a part of the human body such as a finger or a palm; and when the user equipment 400 is a smart band, the user equipment 400 is optionally in contact with a part of the human body such as a finger, a palm, or a wrist. Any other user equipment may be in contact with the human body in similar manners.

In this embodiment, the at least one frequency may be one frequency or multiple frequencies.

In this embodiment, the information rule comprises: a corresponding relationship between information and at least one frequency.

For example, in the information rule, first information is corresponding to 50 Hz, second information is corresponding to 80 Hz, and third information is corresponding to 90 Hz and 100 Hz.

In this embodiment, the capacitance value of the user equipment 400 is a capacitance value of a grounding capacitance of the user equipment 400.

In this embodiment, there are multiple manners of controlling, by the controlling module 43, the capacitance value of the user equipment 400 to change. For example, the controlling module 43 controls a capacitance value of a variable capacitor of the user equipment 400 to change, so that the capacitance value of the grounding capacitance of the user equipment 400 changes, wherein the variable capacitor may be set on a circuit board of the user equipment 400.

In this embodiment, because the user equipment 400 and the at least one other user equipment are both in contact with the human body, when the controlling module 43 controls a capacitance value of the user equipment 400 to change at the at least one frequency, the at least one other user equipment can acquire the at least one frequency and determine the information that the user equipment 400 needs to send based on the same information rule.

For example, the user equipment 400 is a smart wristband. When the smart wristband is worn on a wrist of the human body, as shown in FIG. 2A, Cwd is a capacitance between the wrist and the smart wristband; Cdh is a capacitance between the smart wristband and the human body; Cd is a capacitance of the smart wristband; Ch is a capacitance of the human body; and Cx is an equivalent capacitance on the user equipment side.

By using that one other user equipment is a mobile phone as an example, when the human body uses a finger of a hand wearing the smart wristband to touch the mobile phone, as shown in FIG. 2B, Cx,wd is a capacitance between the wrist and the smart wristband; Cx,dh is a capacitance between the smart wristband and the human body; Cx,d is a capacitance of the smart wristband; Ch is a capacitance of the human body; Cy,fd is a capacitance between the finger and the mobile phone; Cy,dh is a capacitance between the mobile phone and the human body; Cy,d is a capacitance of the mobile phone; Cx' is an equivalent capacitance on the user equipment side; and Cy' is an equivalent capacitance on the other user equipment side. It can be seen from FIG. 2B that when Cx,d changes at at least one frequency, Cy' may also change at the at least one frequency correspondingly. Therefore, the at least one frequency may be detected on the other user equipment side.

In this embodiment, an information interaction solution between devices is provided by determining, by a user equipment, information that needs to be sent to at least one other user equipment, wherein the at least one other user equipment and the user equipment are in contact with a same human body; determining at least one frequency corresponding to the information at least according to the information and a preset information rule; and controlling a capacitance value of the user equipment to change at the at least one frequency. Moreover, information is interacted in an out-of-band manner, which is more convenient.

The following further describes the user equipment 400 in this embodiment by using some optional implementation manners.

In this embodiment, the controlling, by the controlling module 43, a capacitance value of the user equipment 400 to change at the at least one frequency may be controlling the capacitance value of the user equipment 400 to continuously or discretely change at the at least one frequency.

For example, the at least one frequency is a frequency f1, a capacitance value of the user equipment 400 is C1 when t=0. Correspondingly, the controlling module 43 may control the capacitance value of the user equipment 400 to change to C2 when t=1/f1, and may control the capacitance value of the user equipment 400 to change to C1 when t=2/f1; or the controlling module 43 may control the capacitance value of the user equipment 400 to gradually change from C1 to C2 during t=0~1/f1, and may control the capacitance value of the user equipment 400 to gradually change from C2 to C1 during t=1/f1~2/f1.

In this embodiment, optionally, the at least one frequency may be multiple frequencies.

Further, optionally, the controlling module 43 may be specifically configured to: control the capacitance value of the user equipment 400 to change at the multiple frequencies sequentially.

Optionally, the capacitance value of the user equipment 400 may be controlled to cyclically change at the multiple frequencies sequentially.

Optionally, in the information rule, different information is corresponding to the same multiple frequencies, but orders among the multiple frequencies may be different.

For example, in the information rule, first information is corresponding to frequencies f1, f2, and f3, and correspondingly, if the information determined by the first determination module 41 is the first information, the controlling module 43 controls the capacitance value of the user equipment 400 to change at f1, f2, and f3 sequentially; in the information rule, second information is corresponding to frequencies f1, f3, and f2, and correspondingly, if the information determined by the first determination module 41 is the second information, the controlling module 43 controls the capacitance value of the user equipment 400 to change at f1, f3, and f2 sequentially.

In this embodiment, content of the information may be of multiple types. Optionally, the information comprises, but is not limited to, at least one of the following: at least one instruction, sensor data, and at least one transmission parameter.

Optionally, the at least one instruction comprises, but is not limited to, at least one of the following: a screen unlocking instruction, a notice display instruction, a data display instruction, and the like.

Optionally, the sensor data may comprise data of any type, such as temperature data and human body physical feature data.

For example, if the user equipment 400 wants the at least one other user equipment to unlock its(their) screen(s), the information determined by the first determination module 41 comprises a screen unlocking instruction; if the user equipment 400 wants the at least one other user equipment to display a notice received before, for example, a short message, the information determined by the first determination module 41 comprises a notice display instruction; if the user equipment 400 wants the at least one other user equipment to unlock its(their) screen(s) and display a notice received before, the information determined by the first determination module 41 comprises a screen unlocking instruction and a notice display instruction; and if the user equipment 400 wants the at least one other user equipment to display sensor data sensed by the user equipment, the information determined by the first determination module 41 comprises a data display instruction and the sensor data.

Optionally, the at least one transmission parameter comprises, but is not limited to, at least one of the following: a transmission channel, a transmission delay, and a code word.

The transmission channel refers to a data signal transfer channel in which wireless signals act as transmission medium. For example, for frequency hopping communication, a transmission channel may be identified by a HSN.

For an information sender, the transmission delay may be used for determining a starting time of sending the information; and for an information recipient, the transmission delay may be used for determining a starting time of receiving the information.

The code word is also called a code pattern. For the information sender, the code word may be used for encoding the information to be sent; and for the information recipient, the code word may be used for decoding the information received.

In an optional implementation manner, the information comprises: the at least one transmission parameter.

Figure 4B:
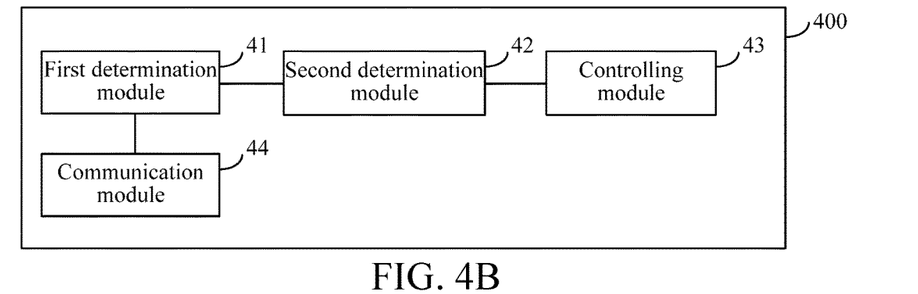
FIG. 4B is a schematic structural diagram of an implementation manner of the embodiment shown in FIG. 4A.

Correspondingly, as shown in FIG. 4B, the user equipment 400 further comprises: a communication module 44, configured to communicate with the at least one other user equipment at least according to the at least one transmission parameter.

Specifically, content that the communication module 44 communicates with the one other user equipment may be of different kinds, for example, an instruction, sensor data, and a connection parameter that needs to be set.

Figure 5A:
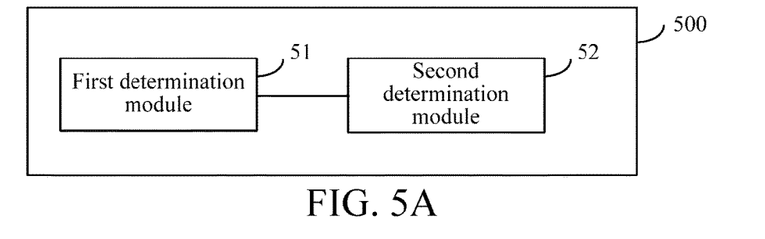
FIG. 5A is a schematic structural diagram of a user equipment Embodiment 2 according to the present application.

FIG. 5A is a schematic structural diagram of a user equipment Embodiment 2 according to the present application. As shown in FIG. 5A, a user equipment 500 comprises:

a first determination module 51, configured to determine at least one frequency at which an equivalent capacitance on the user equipment 500 side changes, wherein the equivalent capacitance on the user equipment 500 side is generated based on that the user equipment 500 and at least one other user equipment are in contact with a same human body; and a second determination module 52, configured to determine information corresponding to the at least one frequency at least according to the at least one frequency and a preset information rule.

In this embodiment, each of the user equipment 500 and the at least one other user equipment may be any device that can interact with a user, which comprises, but is not limited to: a hand-held device, a wearable device, and the like. The hand-held device may be, but is not limited to: a mobile phone, a tablet computer (PAD), and the like; and the wearable device may be, but is not limited to: a smart wristband, a smart ring, and the like.

In this embodiment, equipment types of the at least one other user equipment and the user equipment 500 may be the same or different. For example, the user equipment 500 is a mobile phone, one of the other user equipment is another mobile phone or a PAD; and the user equipment 500 is a mobile phone, one of the other user equipment is a smart wristband.

In this embodiment, the user equipment 500 may be in contact with any part of the human body. For example, when the user equipment 500 is a mobile phone, the user equipment 500 is optionally in contact with a part of the human body such as a finger or a palm; and when the user equipment 500 is a smart band, the user equipment 500 is optionally in contact with a part of the human body such as a finger, a palm, or a wrist. Any other user equipment may be in contact with the human body in similar manners.

In this embodiment, the equivalent capacitance of the user equipment 500 side is an equivalent capacitance detected on the user equipment 500 side. Specifically, because the user equipment 500 and the at least one other user equipment are both in contact with the human body, and equivalent capacitances in this scenario is shown as FIG. 2B, it can be seen that the equivalent capacitance on the user equipment 500 side is at least affected by respective capacitance value of the human body and the at least one other user equipment.

In this embodiment, the at least one frequency may be one frequency or multiple frequencies.

In this embodiment, the information rule comprises: a corresponding relationship between at least one frequency and information and/or a corresponding relationship between at least one frequency range and information.

For example, in the information rule, 50 Hz is corresponding to first information, 80 Hz is corresponding to second information, and 90 Hz and 100 Hz are corresponding to third information. For another example, in the information rule, [50 Hz, 60 Hz) is corresponding to first information, and [80 Hz, 90 Hz) is corresponding to second information.

It should be noted that in a scenario in which the information rule comprises the corresponding relationship between at least one frequency range and information, information error caused by measurement error of the at least one frequency may be reduced to a certain extent.

In this embodiment, an information interaction solution between devices is provided by determining, by a user equipment, at least one frequency at which an equivalent capacitance of a user equipment side changes, wherein the equivalent capacitance of the user equipment side is generated based on that the user equipment and at least one other user equipment are in contact with a same human body; and determining information corresponding to the at least one frequency at least according to the at least one frequency and a preset information rule. Moreover, information is interacted in an out-of-band manner, which is more convenient.

The following further describes the user equipment 500 in this embodiment by using some optional implementation manners.

In this embodiment, there are multiple reasons for which the equivalent capacitance on the user equipment 500 side changes.

In an optional implementation manner, a capacitance value of one other user equipment of the at least one other user equipment changes at the at least one frequency.

Specifically, the capacitance value of the other user equipment may be a capacitance value of a grounding capacitance of the other user equipment.

In a possible scenario, the user equipment 500 is a smart wristband. When the smart band is worn on a wrist of the human body, as shown in FIG. 2A, Cwd is a capacitance between the wrist and the smart wristband; Cdh is a capacitance between the smart wristband and the human body; Cd is a capacitance of the smart wristband; Ch is a capacitance of the human body; and Cx is an equivalent capacitance on the user equipment 500 side.

Further, one other user equipment is a mobile phone. When the human body uses a finger of a hand wearing the smart wristband to touch the mobile phone, as shown in FIG. 2B, Cx,wd is a capacitance between the wrist and the smart wristband; Cx,dh is a capacitance between the smart wristband and the human body; Cx,d is a capacitance of the smart wristband; Ch is a capacitance of the human body; Cy,fd is a capacitance between the finger and the mobile phone; Cy,dh is a capacitance between the mobile phone and the human body; Cy,d is a capacitance of the mobile phone; Cx' is an equivalent capacitance on the user equipment 500 side; and Cy' is an equivalent capacitance on the other user equipment 500 side. It can be seen from FIG. 2B that when Cy,d changes at at least one frequency, Cx' may also change at the at least one frequency correspondingly. Therefore, the at least one frequency may be detected on the user equipment 500 side.

In a possible scenario of this implementation manner, the at least one frequency is multiple frequencies. Correspondingly, the capacitance value of the other user equipment changes at the multiple frequencies sequentially.

In this scenario, optionally, the capacitance value of the other user equipment cyclically changes at the multiple frequencies sequentially.

In this scenario, optionally, in the information rule, orders among multiple frequencies are different, and corresponding information may be the same or different.

For example, the multiple frequencies comprise: f1, f2, and f3, which means that the capacitance value of the other user equipment changes at the frequencies f1, f2, and f3 sequentially, and the multiple frequencies comprise: f1, f3, and f2, which means that the capacitance value of the other user equipment changes at the frequencies f1, f3, and f2 sequentially; and further, information corresponding to f1, f2, and f3 may be the same as, or different from, information corresponding to f1, f3, and f2.

For another example, the multiple frequencies comprise: f1, f2, and f3. In the information rule, f1 is corresponding to first information, f2 is corresponding to second information, and f3 is corresponding to third information; or f1, f2, and f3 are corresponding to fourth information; or f1 and f2 are corresponding to fifth information, and f3 is corresponding to sixth information; or the like.

In another optional implementation manner, the at least one frequency is multiple frequencies, and capacitance values of other user equipment of the at least one other user equipment change at the multiple frequencies.

For example, the multiple frequencies comprise: f1, f2, f3, and f4, and the multiple other user equipment comprise: another user equipment A, another user equipment B, and another user equipment C, wherein a capacitance value of user equipment A changes at the frequency f1, a capacitance value of user equipment B changes at the frequency f2, and a capacitance value of user equipment C changes at frequencies f3 and f4; and further, in the information rule, f1 is corresponding to first information, f2 is corresponding to second information, and f3 and f4 are corresponding to third information, or f3 is corresponding to fourth information and f4 is corresponding to fifth information.

In this implementation manner, optionally, the first determination module 51 determines the multiple frequencies in a manner of filtering.

In this embodiment, content of the information may be of different kinds. Optionally, the information comprises, but is not limited to, at least one of the following: at least one instruction, sensor data, and at least one transmission parameter.

Figure 5B:
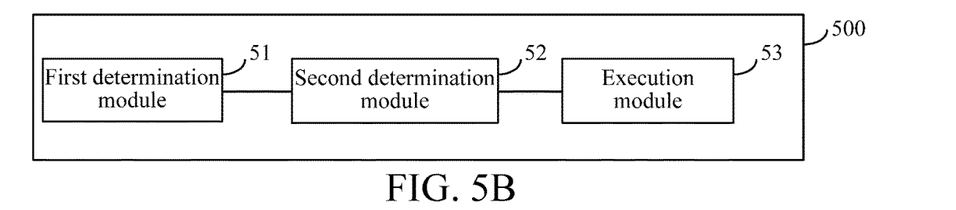
FIGS. 5B and 5C are separately schematic structural diagrams of an implementation manner of the embodiment shown in FIG. 5A.

In an optional implementation manner, the information comprises: the at least one instruction. As shown in FIG. 5B, the user equipment 500 further comprises: an execution module 53, configured to execute the at least one instruction.

The at least one instruction comprises, but is not limited to, at least one of the following: a screen unlocking instruction, a notice display instruction, a data display instruction, and the like.

In this implementation manner, optionally, the information further comprises: the sensor data.

The sensor data may comprise data of any type, such as temperature data and human body physical feature data.

For example, if the information determined by the second determination module 52 comprises a screen unlocking instruction, the execution module 53 unlocks its screen; if the information determined by the second determination module 52 comprises a notice display instruction, the execution module 53 displays a notice received before, for example, a short message; if the information determined by the second determination module 52 comprises a screen unlocking instruction and a notice display instruction, the execution module 53 unlocks a screen of the user equipment 500 and displays a notice received before; and if the information determined by the second determination module 52 comprises a data display instruction and sensor data, the execution module 53 displays the determined sensor data.

In another optional implementation manner, the information comprises: the sensor data.

The sensor data may comprise data of any type(s), such as temperature data and human body physical feature data.

For example, a temperature sensor in one other user equipment senses temperature data, determines at least one frequency corresponding to the temperature data according to the information rule, and controls a capacitance value thereof to change at the at least one frequency. Correspondingly, because the other user equipment and the user equipment 500 are both in contact with the human body, the first determination module 51 of the user equipment 500 may determine the at least one frequency, and the second determination module 52 may determine the temperature data corresponding to the at least one frequency according to the information rule.

Figure 5C:
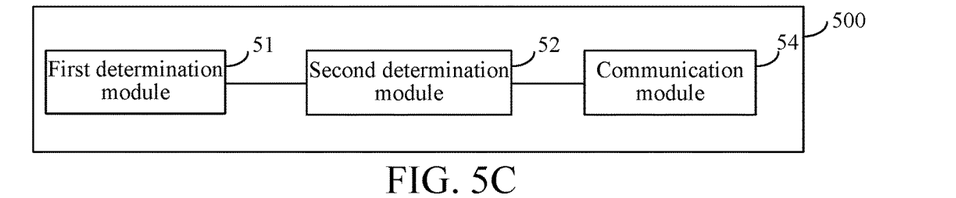

In another optional implementation manner, the information comprises: the at least one transmission parameter. Correspondingly, as shown in FIG. 5C, the user equipment 500 further comprises: a communication module 54, configured to communicate with the at least one other user equipment at least according to the at least one transmission parameter.

Specifically, the at least one transmission parameter comprises, but is not limited to, at least one of the following: a transmission channel, a transmission delay, and a code word.

The transmission channel refers to a data signal transfer channel in which wireless signals act as transmission medium. For example, for frequency hopping communication, a transmission channel may be identified by a HSN.

For an information sender, the transmission delay may be used for determining a starting time of sending the information; and for an information recipient, the transmission delay may be used for determining a starting time of receiving the information.

The code word is also called a code pattern. For the information sender, the code word may be used for encoding the information to be sent; and for the information recipient, the code word may be used for decoding the information received.

Specifically, content that the communication module 54 communicates with the one other user equipment may be of different kinds, for example, instruction, sensor data, and connection parameter that needs to be set.

Figure 6:
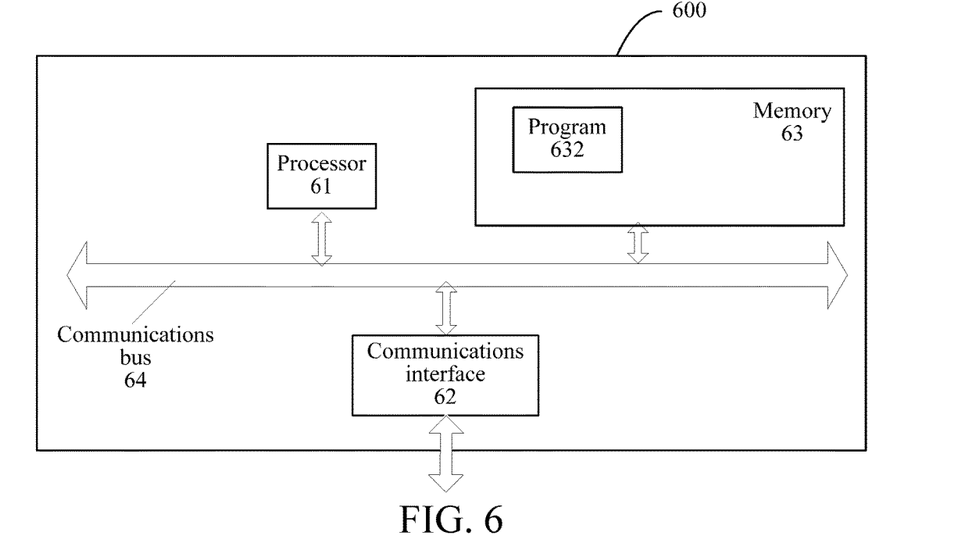
FIG. 6 is a schematic structural diagram of a user equipment Embodiment 3 according to the present application.

FIG. 6 is a schematic structural diagram of a user equipment Embodiment 3 according to the present application; and As shown in FIG. 6, a user equipment 600 comprises:

a processor 61, a communications interface 62, a memory 63, and a communications bus 64, where The processor 61, the communications interface 62, and the memory 63 communicate with each other by using the communications bus 64.

The communications interface 62 is configured to communicate with, for example, other user equipment.

The processor 61 is configured to execute a program 632, and may specifically execute relevant steps in the above-described interaction method Embodiment 1.

Specifically, the program 632 may comprise program code, wherein the program code comprises computer operation instructions.

The processor 61 may be a central processing unit (CPU), or an application specific integrated circuit (ASIC), or may be configured as one or more integrated circuits that implement the interaction method Embodiment 1.

The memory 63 is configured to store the program 632. The memory 63 may comprise a high speed random access memory (RAM), and may also comprise a non-volatile memory such as at least one magnetic disk memory. The program 632 may be specifically configured to enable the user equipment 600 to perform the following steps:

determining information that needs to be sent to at least one other user equipment, wherein the at least one other user equipment and the user equipment 600 are in contact with a same human body;

determining at least one frequency corresponding to the information at least according to the information and a preset information rule; and controlling a capacitance value of the user equipment 600 to change at the at least one frequency.

Optionally, the user equipment 600 further comprises: a variable capacitance. Correspondingly, the controlling a capacitance value of the user equipment 600 to change at the at least one frequency is specifically: controlling a capacitance value of the variable capacitance to change at the at least one frequency.

For the specific implementation of the steps in the program 632, reference may be made to the corresponding descriptions of corresponding steps and units in the foregoing interaction method Embodiment 1, which are not described herein again.

Figure 7:
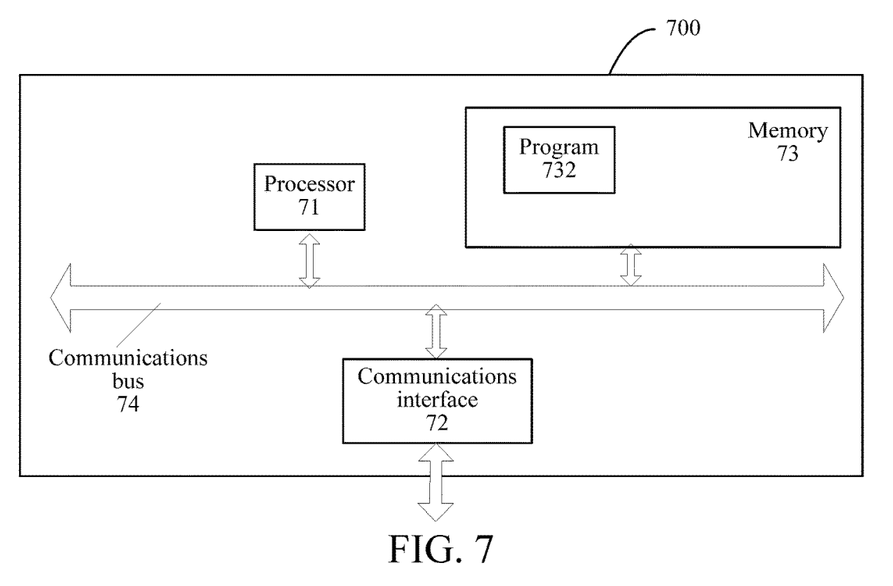
FIG. 7 is a schematic structural diagram of a user equipment Embodiment 4 according to the present application.

FIG. 7 is a schematic structural diagram of a user equipment Embodiment 4 according to the present application. As shown in FIG. 7, a user equipment 700 comprises:

a processor 71, a communications interface 72, a memory 73, and a communications bus 74, where The processor 71, the communications interface 72, and the memory 73 communicate with each other by using the communications bus 74.

The communications interface 72 is configured to communicate with, for example, other user equipment.

The processor 71 is configured to execute a program 732, and may specifically execute relevant steps in foregoing interaction method Embodiment 2.

Specifically, the program 732 may comprise program code, wherein the program code comprises computer operation instructions.

The processor 71 may be a central processing unit (CPU), or an application specific integrated circuit (ASIC), or may be configured as one or more integrated circuits that implement the interaction method Embodiment 2.

The memory 73 is configured to store the program 732. The memory 73 may comprise a high speed random access memory (RAM), and may also comprise a non-volatile memory such as at least one magnetic disk memory. The program 732 may be specifically configured to enable the user equipment 700 to perform the following steps:

determining at least one frequency at which an equivalent capacitance of a user equipment 700 side changes, wherein the equivalent capacitance of the user equipment 700 side is generated based on that the user equipment 700 and at least one other user equipment are in contact with a same human body; and determining information corresponding to the at least one frequency at least according to the at least one frequency and a preset information rule.

For the specific implementation of the steps in the program 732, reference may be made to the corresponding descriptions of corresponding steps and units in the foregoing interaction method Embodiment 2, which are not described herein again.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium may be any medium that can store program code, such as a USB flash drive, a removable hard disk, a read-only memory (ROM), a random access memory (RAM), a magnetic disk, or an optical disc.

The foregoing implementations are only used to describe the present application, but not to limit the present application. A person of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. An interaction method, comprising:
   determining, by a user equipment, information that needs to be sent to at least one other user equipment, wherein the at least one other user equipment and the user equipment are in contact with a same human body, wherein the information comprises at least one transmission parameter, including at least one of a transmission channel, a transmission delay, and a code word;
   determining at least one frequency corresponding to the information at least according to the information and a preset information rule, wherein the preset information rule comprises: a corresponding relationship between information and at least one frequency, and wherein when the at least one frequency includes multiple frequencies, different information corresponds to the same multiple frequencies, and orders among the same multiple frequencies corresponding to the different information are different; and
   controlling a capacitance value of the user equipment to change at the at least one frequency.

2. The method of claim 1, wherein the at least one frequency is multiple frequencies.

3. The method of claim 2, wherein the controlling a capacitance value of the user equipment to change at the at least one frequency comprises:
   controlling the capacitance value of the user equipment to change at the multiple frequencies sequentially.

4. The method of claim 1, wherein the information comprises at least one of the following: at least one instruction, sensor data, and at least one transmission parameter.

5. The method of claim 1, wherein the information comprises:
   the at least one transmission parameter; and
   the method further comprises: communicating with the at least one other user equipment at least according to the at least one transmission parameter.

6. An interaction method, comprising:
   determining, by a user equipment, at least one frequency at which an equivalent capacitance on the user equipment side changes, wherein the equivalent capacitance on the user equipment side is generated based on that the user equipment and at least one other user equipment are in contact with a same human body; and
   determining information corresponding to the at least one frequency at least according to the at least one frequency and a preset information rule, wherein the information comprises at least one transmission parameter, including at least one of a transmission channel, a transmission delay, and a code word, wherein the preset information rule comprises: a corresponding relationship between information and at least one frequency, and wherein when the at least one frequency includes multiple frequencies, different information corresponds to the same multiple frequencies, and orders among the same multiple frequencies corresponding to the different information are different.

7. The method of claim 6, wherein a capacitance value of one other user equipment of the at least one other user equipment changes at the at least one frequency.

8. The method of claim 6, wherein the at least one frequency is multiple frequencies, and capacitance values of other user equipment of the at least one other user equipment respectively change at the multiple frequencies.

9. The method of claim 6, wherein the information comprises at least one of the following: at least one instruction, sensor data, and at least one transmission parameter.

10. The method of claim 6, wherein the information comprises: the at least one instruction; and
the method further comprises: executing the at least one instruction.

11. The method of claim 6, wherein the information comprises: the at least one transmission parameter; and
the method further comprises: communicating with the at least one other user equipment at least according to the at least one transmission parameter.

12. A user equipment, comprising:
a first determination module, configured to determine information that needs to be sent to at least one other user equipment, wherein the at least one other user equipment and the user equipment are in contact with a same human body, wherein the information comprises at least one transmission parameter, including at least one of a transmission channel, a transmission delay, and a code word;
a second determination module, configured to determine at least one frequency corresponding to the information at least according to the information and a preset information rule, wherein the preset information rule comprises: a corresponding relationship between information and at least one frequency, and wherein when the at least one frequency includes multiple frequencies, different information corresponds to the same multiple frequencies, and orders among the same multiple frequencies corresponding to the different information are different; and
a controlling module, configured to control a capacitance value of the user equipment to change at the at least one frequency.

13. The user equipment of claim 12, wherein the at least one frequency is multiple frequencies.

14. The user equipment of claim 13, wherein the controlling module is specifically configured to: control the capacitance value of the user equipment to change at the multiple frequencies sequentially.

15. The user equipment of claim 12, wherein the information comprises at least one of the following: at least one instruction, sensor data, and at least one transmission parameter.

16. The user equipment of claim 12, wherein the information comprises: the at least one transmission parameter; and
the user equipment further comprises: a communication module, configured to communicate with the at least one other user equipment at least according to the at least one transmission parameter.

17. A user equipment, comprising:
a first determination module, configured to determine at least one frequency at which an equivalent capacitance on the user equipment side changes, wherein the equivalent capacitance on the user equipment side is generated based on that the user equipment and at least one other user equipment are in contact with a same human body; and
a second determination module, configured to determine information corresponding to the at least one frequency at least according to the at least one frequency and a preset information rule, wherein the information comprises at least one transmission parameter, including at least one of a transmission channel, a transmission delay, and a code word, wherein the preset information rule comprises: a corresponding relationship between information and at least one frequency, and wherein when the at least one frequency includes multiple frequencies, different information corresponds to the same multiple frequencies, and orders among the same multiple frequencies corresponding to the different information are different.

18. The user equipment of claim 17, wherein a capacitance value of one other user equipment of the at least one other user equipment changes at the at least one frequency.

19. The user equipment of claim 17, wherein the at least one frequency is multiple frequencies, and capacitance values of other user equipment of the at least one other user equipment respectively change at the multiple frequencies.

20. The user equipment of claim 17, wherein the information comprises at least one of the following: at least one instruction, sensor data, and at least one transmission parameter.

21. The user equipment of claim 17, wherein the information comprises: the at least one instruction; and
the user equipment further comprises: an execution module, configured to execute the at least one instruction.

22. The user equipment of claim 17, wherein the information comprises: the at least one transmission parameter; and
the user equipment further comprises: a communication module, configured to communicate with the at least one other user equipment at least according to the at least one transmission parameter.

23. A non-transitory computer-readable storage medium comprising executable instructions that, in response to execution, cause a device comprising a processor to perform operations, comprising:
determining, by a user equipment, information that needs to be sent to at least one other user equipment, wherein the at least one other user equipment and the user equipment are in contact with a same human body, wherein the information comprises at least one transmission parameter, including at least one of a transmission channel, a transmission delay, and a code word;
determining at least one frequency corresponding to the information at least according to the information and a preset information rule, wherein the preset information rule comprises: a corresponding relationship between information and at least one frequency, and wherein when the at least one frequency includes multiple frequencies, different information corresponds to the same multiple frequencies, and orders among the same multiple frequencies corresponding to the different information are different; and
controlling a capacitance value of the user equipment to change at the at least one frequency.

24. A non-transitory computer-readable storage medium comprising executable instructions that, in response to execution, cause a device comprising a processor to perform operations, comprising:
determining, by a user equipment, at least one frequency at which an equivalent capacitance on the user equipment side changes, wherein the equivalent capacitance on the user equipment side is generated based on that the user equipment and at least one other user equipment are in contact with a same human body; and
determining information corresponding to the at least one frequency at least according to the at least one frequency and a preset information rule, wherein the information comprises at least one transmission parameter, including at least one of a transmission channel, a transmission delay, and a code word, wherein the preset information rule comprises: a corresponding relationship between information and at least one frequency, and wherein when the at least one frequency includes multiple frequencies, different information corresponds to the same multiple frequencies, and orders among the same multiple frequencies corresponding to the different information are different.

* * * * *